United States Patent
Berry

Patent Number: 5,707,528
Date of Patent: Jan. 13, 1998

[54] SYSTEM AND PROCESS FOR TREATING ORGANIC-CONTAMINATED AQUEOUS WASTE STREAMS

[76] Inventor: William Wesley Berry, P.O. Box 2145, Lakeland, Fla. 33806-2145

[21] Appl. No.: 650,330

[22] Filed: May 20, 1996

[51] Int. Cl.⁶ .................................................. C02F 1/28
[52] U.S. Cl. ............................ 210/663; 210/668; 210/669; 210/671; 210/673; 210/692; 210/693; 210/760; 210/192
[58] Field of Search .......................... 210/673, 760, 210/192, 692, 693, 799, 143, 668, 669, 662, 694, 663, 671

[56] References Cited

U.S. PATENT DOCUMENTS

| | | | |
|---|---|---|---|
| 3,442,798 | 5/1969 | Schoeffel | 210/694 |
| 3,494,862 | 2/1970 | Horowitz | 210/693 |
| 3,510,265 | 5/1970 | Kawahata | 210/192 |
| 3,518,183 | 6/1970 | Evans | 210/693 |
| 3,520,806 | 7/1970 | Haigh | 210/692 |
| 3,531,463 | 9/1970 | Gustafson | 210/692 |
| 3,591,494 | 7/1971 | Crouch et al. | 210/693 |
| 3,625,886 | 12/1971 | Mattia | 210/673 |
| 3,732,163 | 5/1973 | Lapidot | 210/760 |
| 3,779,909 | 12/1973 | Wisfeld et al. | 210/668 |
| 3,929,631 | 12/1975 | Winkler | 210/693 |
| 4,141,826 | 2/1979 | Alford et al. | 210/673 |
| 4,648,977 | 3/1987 | Garg et al. | 210/673 |
| 4,722,797 | 2/1988 | Gauer et al. | 210/662 |
| 4,735,728 | 4/1988 | Wemhoff | 210/668 |
| 5,053,140 | 10/1991 | Hurst | 210/760 |
| 5,069,779 | 12/1991 | Brown et al. | 210/143 |
| 5,087,374 | 2/1992 | Ding | 210/673 |
| 5,114,591 | 5/1992 | Patzelt et al. | 210/692 |
| 5,135,656 | 8/1992 | Means et al. | 210/692 |
| 5,248,395 | 9/1993 | Rastelli et al. | 210/673 |
| 5,505,856 | 4/1996 | Campen et al. | 210/668 |
| 5,531,902 | 7/1996 | Gallup | 210/692 |
| 5,544,072 | 8/1996 | Zimmerman et al. | 210/143 |

*Primary Examiner*—Cynthia L. Nessler
*Attorney, Agent, or Firm*—George A. Bode; Daniel E. Maddux; Bode & Associates

[57] ABSTRACT

A method and system for removing miscible organic compounds from contaminated water is disclosed. The system of the present invention comprises a polisher for filtering out trace amounts of suspended solids, a system of columns connected in series and containing an adsorbent to adsorb miscible organic compounds, a source of ozone, and a contact tower for contacting the contaminated water with the ozone such that the ozone decomposes the miscible organic compounds to produce water that is substantially free of miscible organic compounds. The present invention also comprises a method of rejuvenating the adsorbent in individual columns.

17 Claims, 1 Drawing Sheet

SYSTEM AND PROCESS FOR TREATING ORGANIC-CONTAMINATED AQUEOUS WASTE STREAMS

BACKGROUND OF THE INVENTION

1. Field of the Invention

The present invention relates to a system and process for treating contaminated water, particularly a system and process for removing miscible organic compounds from contaminated water.

2. General Background

In recent times, the Environmental Protection Agency, as well as individual state regulatory agencies, have instituted rigid requirements for discharging or otherwise disposing of wastes into the environment. Commercial and industrial wastewater contains a variety of contaminants that can no longer be discharged into public sewers or fed to sewage treatment facilities. State and local environmental protection agencies may equal or surpass the federal standards. Therefore, it has become necessary for local industries to purify their wastewater, or risk heavy fines and operating restrictions.

Soluble, or miscible, organic contaminants in aqueous streams discharged from industrial, municipal and commercial spill sources pose a serious environmental problem and have trouble meeting regulatory requirements necessary for release or discharge. In many cases, aqueous streams originating from organic contamination sources consist of both miscible and immiscible organic contaminants. The immiscible contaminants can be easily removed from the wastewater with oil/water separators, floating skimmers or similar devices. However, the miscible contaminants are more difficult to remove since, in most cases, the contaminant must be removed to a low level of concentration in the wastewater. Volatile organic aromatics ("VOAs") such as benzene, toluene, ethylbenzene and xylene ("the BTEX family"), along with lighter organic contaminants such as methyl tert-butyl ether ("MTBE") are particularly difficult to remove.

Several devices have been patented which are aimed at removing contaminants from wastewater.

U.S. Pat. No. 5,447,640 issued to Permelec Electrode Ltd., of Japan, on the application of T. Omi, et al., and entitled "Method And Apparatus For Sterilization Of And Treatment With Ozonized Water" teaches a method and system for the further purification of pure water having a filter and polisher for removing inorganic substances and suspended solids from the water and an ozone generator for introducing ozone into the water to eliminate bacteria and other organisms.

U.S. Pat. No. 5,443,853 issued to Polybac Corporation on the application of Anthony M. Mamone and entitled "Method Of Clarifying Wastestreams" discloses a method of removing oils, dissolved solids and particulates from contaminated water by adding acid and/or caustic to adjust the pH of the contaminated water, adding a coagulant to precipitate the dissolved solids, adding a flocculent to the treated water, and feeding the treated water upwards through a vertical plate packed chamber to separate the oils and solids from the contaminated water.

U.S. Pat. No. 4,687,573 issued to Pall Corporation on the application of J. D. Miller et al., and entitled "Sorbing Apparatus" discloses an apparatus for treating contaminated fluids having a prefilter and a pair of sorbing chambers connected in parallel which contain a sorbent material or mixture of sorbent materials. A control system directs the influent contaminated fluid to one sorbing chamber where the sorbent material adsorbs the desired component from the influent. After a predetermined time, the control system redirects the influent to the other sorbing chamber for treatment. Some of the treated influent is recirculated to the first sorbing chamber, which is off-line, to regenerate the sorbent material in the first sorbing chamber. For influent water contaminated with chemical pollutants, the sorbing material may be activated carbon or a molecular sieve.

U.S. Pat. No. 4,129,499 issued to The British Petroleum Company Limited on the application of R. J. R. Cairns et al., and entitled "Oil Separation Material" discloses a method and apparatus for separating oil from water comprising the step of passing the contaminated water through one or more purification beds which contain treated solid particles such that the oil coalesces to form an oil phase and a water phase. The treated particles include solid particles which have been treated with a solution of a hydrocarbon activating agent and a dispersant additive such as a polymer or co-polymer with polar functions.

U.S. Pat. No. 5,350,527 issued to J. C. Kitko and entitled "Oily Water Separation And Water Reclamation System" discloses a system and process for removing impurities such as grease, fuels and solid particulate matter from contaminated water having a pair of filters for removing suspended solids, a settling tank for allowing the oil/water to physically separate into two phases, a filter for further removing suspended solids from the contaminated water, a heavy oil gravity separator for physically separating the oil from the contaminated water, a light oil coalescer for further physically separating the oil from the contaminated water, and an oil separator for adsorbing the oil and further filtering suspended solids from the contaminated water. The system may further include a carbon filter to further remove impurities from the contaminated water.

U.S. Pat. No. 5,316,821 issued to NKK Corporation et al., of Japan, on the application of S. Otani, et al., and entitled "Partition Plate For Multiple-Stage Adsorption Separator" discloses a partition plate for a multi-stage adsorption separator system with simulated moving-beds for separating a specific fluid from another fluid or plurality of fluids. Conventional substances such as silica gel, zeolite and the like are used as the adsorbent.

U.S. Pat. No. 5,069,779 issued to Kinetico, Incorporated on the application of K. E. Brown, et al., and entitled "Water Treatment System" discloses a system for treating water having a series of resin filled tanks connected in parallel and a control system such that when the resin in a tank is nearly exhausted, the control system disconnects the tank and supplies regeneration fluid to the tank until the resin is regenerated, at which point the control system reconnects the tank to the flow of contaminated water.

U.S. Pat. No. 5,167,829 issued to H. Diamond, et al., and entitled "System For Treating Commercial Waste Effluents" discloses a method for purifying laundry-type wastewater containing immiscible substances such as fats, oils and grease, comprising the steps of filtering the suspended solids from the wastewater, acidifying the wastewater to release and disperse the emulsified fats, oils and grease in the wastewater, and coalescing the fats, oils and grease in the wastewater to separate the released and dispersed fats, oils and grease from the wastewater.

U.S. Pat. No. 5,178,755 issued to ESTR Inc., on the application of G. R. LaCrosse and entitled "UV-Enhanced Ozone Wastewater Treatment System" discloses a system for removing contaminants from wastewater having a series of clarifiers connected in series, a collection tank, ultraviolet lights, an ozone generator, a contact tower, and a carbon media filter. Contaminated water is fed through the series of clarifiers wherein treated wastewater from the contact tower, which contains ozone and is exposed to ultraviolet radiation, is circulated through the clarifiers to physically separate the solid contaminants from the wastewater. The clarified wastewater is then collected in the collection tank, filtered with a sand media filter, and exposed to ultraviolet radiation to eliminate bacterial impurities. The treated wastewater is then fed to the contact tower to further remove contaminants in the wastewater. Some of the treated wastewater is withdrawn from the contact tower, injected with ozone and circulated to the clarifiers as described above. When the wastewater has been sufficiently purified, it is further filtered in a carbon media filter and discharged.

However, these devices do not meet the needs of the present invention for the following reasons. The method and apparatus of Omi, et al. '640 are designed to operate on pure water, not contaminated water. Furthermore, the method and apparatus are primarily directed to removing suspended solids from the water, not miscible contaminants.

The method of Mamone '853 is primarily directed to removing emulsified oils, dissolved solids and particulates, not miscible organic contaminants, from waste-water. Furthermore, the method is somewhat complicated, requiring the addition of acid and/or caustic to manipulate the pH of the wastewater and a coagulant and flocculent to assist in separating the oils and solids from the wastewater.

The apparatus of Miller, et al. '573 is not directed solely to removing contaminants from water; it is also somewhat inefficient in removing contaminants from the influent fluid by connecting the sorbing chambers in parallel instead of in series, which allows the sorbing chambers to remove greater amounts of the contaminants.

The method and apparatus of Cairns, et al. '499 is directed primarily to separating oil, not miscible organic contaminants, from seawater. Furthermore, they rely primarily on physical separation, via coalescing, to remove the contaminants from the water, which may not always work with heavier organic contaminants like xylene.

The system and process of Kitko '527 are directed to removing grease, fuels and solid particulate matter from water used to clean and degrease heavy equipment, not miscible organic contaminants from wastewater. In particular, the system and process are designed to separate immiscible fluids having different densities, not miscible organic compounds from contaminated water. Also, the system and process are somewhat limited in being directed mainly to physical separation of the impurities from the wastewater, which may not always work with heavier organic contaminants like xylene. Furthermore, the system and method preferably employ a carbon filter to further separate contaminants from the treated water, which requires disposal of the exhausted carbon and thereby generates additional waste; or, potentially the need for off-site regeneration.

The apparatus of Otani, et al. '821 is not specifically directed to removing miscible organic contaminants from contaminated water.

The system of Brown, et al. '779, like Miller, et al. '573, is somewhat inefficient in removing contaminants from the wastewater by connecting the resin filled tanks in parallel instead of in series. Also, the regeneration process is overly complicated in requiring a regeneration fluid for the resin in the tanks instead of just recirculating treated effluent, as in Miller, et al. '573.

The method of Diamond, et al. '829 is directed primarily to purifying laundry-type wastewater containing immiscible fluids, along with fats, oils and grease, and not miscible organic contaminants as are found in industrial wastewater. Also, the method is somewhat complicated, requiring the wastewater to be treated with an amine-based emulsifying detergent and acidifying the wastewater to release and disperse the contaminants.

The system of LaCrosse '755 is somewhat limited in relying mainly on physical separation in a series of clarifiers, which may not always work with heavier organic contaminants like xylene. Furthermore, his preferred embodiment uses a carbon filter to separate out contaminants from the treated water, which requires disposal of the exhausted carbon and thereby generates additional waste; (or, as in Kitko '527, the need for off-site regeneration).

Thus, a need exists for a method and system for removing miscible organic compounds from contaminated water.

In particular, a need exists for a system and process for removing VOAs such as the BTEX family of compounds, along with lighter organic contaminants such as MTBE, from contaminated water.

A need also exists for a system and process for removing miscible organic contaminants from contaminated water on an essentially continuous basis.

Further, it would be advantageous if such a system would be regenerated on-site, so that the sorbent media used would have an extended working life.

SUMMARY OF THE PRESENT INVENTION

The preferred embodiment of the apparatus of the present invention solves the aforementioned problems in a straightforward and simple manner. What is provided is a system and method for removing suspended solids and miscible organic compounds such as MTBE and the BTEX family of compounds from contaminated water. The system of the present invention comprises generally a source of contaminated water containing miscible organic compounds, a prefilter system which includes at least a polisher for removing trace amounts of suspended solids from the contaminated water to produce polished water, means for communicating the contaminated water from the source of contaminated water to the prefilter system, a system of columns connected in series with a lead column and a tail column and which contain an adsorbent for irreversibly adsorbing miscible organic compounds from the polished water to produce primary treated water, means for communicating the polished water from one column to the next column connected in series, means for communicating the polished water from the prefilter system to the lead column, a source of ozone, a contact tower for contacting the primary treated water with the ozone such that the ozone decomposes the miscible organic compounds to produce secondary treated water that is substantially free of suspended solids and miscible organic compounds, means for communicating the ozone from the source of ozone to the contact tower, means for communicating the primary treated water from the tail column to the contact tower, and means for discharging the secondary treated water from the contact tower.

The method of the present invention comprises the steps of: providing contaminated water which contains miscible organic compounds; feeding the contaminated water to a prefilter system which includes a polisher; filtering out the suspended solids from the contaminated water in the polisher to produce polished water; feeding the polished water from the filtering step to a system of columns which contain an adsorbent and are connected in series with a lead column and a tail column such that the polished water enters the system of columns through the lead column and exits through the tail column; irreversibly adsorbing the miscible organic compounds from the polished water with the adsorbent to produce primary treated water; providing a source of ozone; feeding the ozone to a contact tower; feeding the primary treated water to a contact tower; decomposing the miscible organic compounds in the primary treated water with the ozone in the contact tower to produce secondary treated water that is substantially free of miscible organic compounds and suspended solids; and discharging the secondary treated water from the contact tower.

The present invention also comprises a method of rejuvenating the adsorbent in individual columns in a system of columns when the adsorbent has become about 75% to 80% exhausted, the system of columns being connected in series with a lead column and a tail column and fed contaminated water which contains miscible organic compounds such that the adsorbent irreversibly adsorbs the miscible organic compounds from the contaminated water. The method of rejuvenation comprises the steps of: disconnecting the lead column from the system of columns; transferring the flow of contaminated water from the lead column directly to the next column connected in series such that the next column becomes the lead column; connecting in series a column with fresh adsorbent to the tail column such that the connected column becomes the tail column; providing a source of ozone and water; circulating the ozone and water through the exhausted adsorbent in the disconnected column; removing miscible organic compounds from the exhausted adsorbent with the ozone and water to rejuvenate the adsorbent; and discharging the ozone and water, with the miscible organic compounds, from the disconnected column to produce a rejuvenated adsorbent column.

In view of the above, it is an object of the present invention to provide a method and system for removing miscible organic compounds from contaminated water.

It is a further object of the present invention to provide such a system and process for removing VOAs such as the BTEX family of compounds, along with lighter organic contaminants such as MTBE, from contaminated water.

In view of the above objects it is a feature of the present invention to provide a system and process for removing miscible organic contaminants from contaminated water on an essentially continuous basis.

It is another feature of the present invention to provide a method of rejuvenating the adsorbent in individual columns in a system of columns when the adsorbent has become about 75% to 80% exhausted, the system of columns being connected in series with a lead column and a tail column and fed contaminated water which contains miscible organic compounds such that the adsorbent irreversibly adsorbs the miscible organic compounds from the contaminated water.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
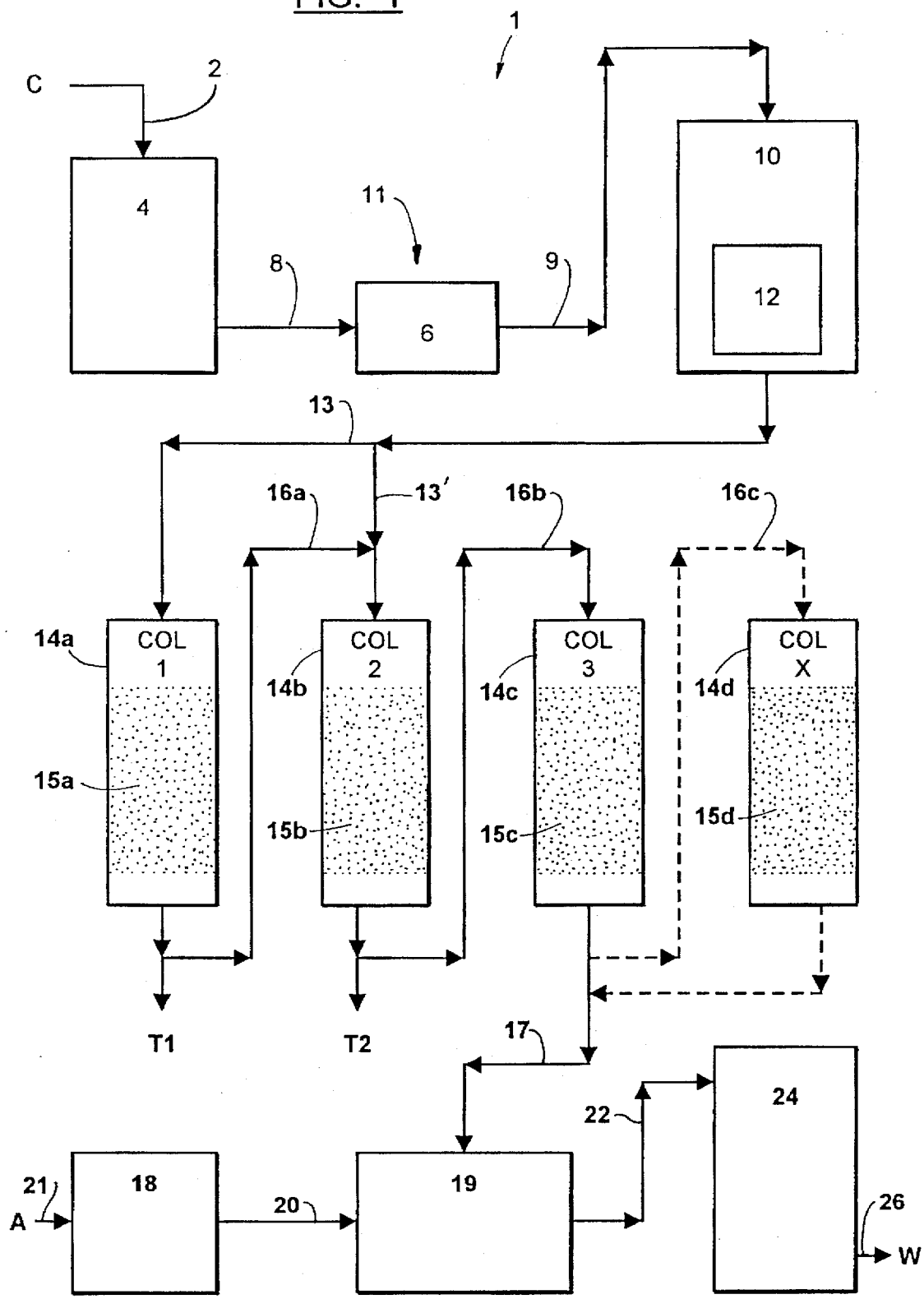
FIG. 1 is a schematic view of the preferred embodiment of the system and method of the present invention.

Referring now to the drawing, and in particular FIG. 1, the system of the present invention is designated generally by the numeral 1. System 1 is generally comprised of source 4 of contaminated water to be treated, prefilter system 10 including polisher 12, communicating means 11 for communicating the contaminated water from source 4 to prefilter system 10, system of columns 14 containing adsorbent 15, line 13 for communicating the polished contaminated water from prefilter system 10 to columns 14, connecting lines 16 for communicating the effluent of one column as influent to the next column, source 18 of ozone, contact tower 19 for contacting the primary treated contaminated water with the ozone, line 17 for communicating the primary treated contaminated water from system of columns 14 to contact tower 19, line 20 for communicating ozone from source 18 to contact tower 19, surge tank 24 for storing the secondary treated contaminated water, line 22 for communicating the secondary treated contaminated water from contact tower 19 to surge tank 24, and discharge line 26 for discharging the secondary treated contaminated water from contact tower 19.

Source 4 of contaminated water is preferably an influent surge tank which receives contaminated water C from an industrial or commercial use via wastewater influent line 2. Contaminated water C generally contains miscible organic compounds such as MTBE or the BTEX family of compounds and trace amounts of suspended solids. It may also contain various chlorinated organics such as perchloroethylene (PERC), for which the sorbents have an appreciable affinity.

Contaminated water C is communicated from surge tank 4 to prefilter system 10 with communicating means 11. Communicating means 11 preferably includes pump 6 for pumping contaminated water C from surge tank 4 to prefilter system 10, pump inlet line 8 for communicating contaminated water C from surge tank 4 to pump 6, and pump outlet line 9 for communicating contaminated water C from pump 6 to prefilter system 10.

Polisher 12 in prefilter system 10 filters out trace amounts of suspended solids from contaminated water C to produce polished water. If contaminated water C contains more than trace amounts of suspended solids or immiscible organic compounds, then a filter, coalescer or oil/water separator can be inserted in prefilter system 10 prior to polisher 12 to filter out the additional suspended solids or immiscible organic compounds.

System of columns 14 can comprise any number of columns but preferably is four (4). Three (3) columns 14a, 14b, 14c are connected in series, with column 14a being the lead column and column 14c being the tail column. The fourth column 14d is not initially connected to the other columns 14a, 14b, 14c, as will be explained below. Connecting lines 16 connects columns 14a, 14b, 14c in series. Connecting line 16a connects column 14a to column 14b such that the effluent of column 14a is the influent to column 14b. Connecting line 16b likewise connects column 14b to column 14c such that the effluent of column 14b is the influent to column 14c. Connecting lines 16a, 16b include tap T1, T2, respectively, for sampling the treated polished water as it exits columns 14a, 14b, respectively. Columns 14 are similar to those employed for activated carbon adsorption.

Adsorbent 15 is a block co-polymer which irreversibly adsorbs primarily the heavier miscible organic compounds from the polished water. Adsorbent 15 adsorbs the majority of the more complex and heavier organic compounds, such as the ethylbenzene and xylene compounds of the BTEX family, from the polished water. Adsorbent 15 can be styrene-isoprene-styrene (SIS), styrene-butadiene-styrene (SBS), or styrene-ethylene/butylene-styrene (SE/BS) depending on the organic compounds present in the contaminated water.

The choice of adsorbent is based primarily on exploratory/adsorbing tests wherein the affinity of the polymer for a particular organic is measured using established techniques familiar to those skilled in the art. Typically, however, use of SIS or SBS materials will provide adequate contaminant removal with high xylene-containing materials. "Lighter" contaminants (e.g. toluene-rich) favor the SE/BS sorbent.

Typical sorbents which are suitable for this invention include Shell's Kraton Ford G polymer products.

Line 13 communicates the polished water from prefilter 10 to lead column 14a. The polished water traverses through columns 14a, 14b, 14c such that adsorbent 15a, 15b, 15c of columns 14a, 14b, 14c, respectively, adsorbs the miscible organic compounds from the polished water to produce primary treated water in which the majority of the heavier organic compounds have been removed. The polished water contacts adsorbent 15a, 15b, 15c in columns 14a, 14b, 14c, respectively, in a countercurrent flow such that the most contaminated water contacts adsorbent 15a, which is closest to exhaustion, and the least contaminated water contacts adsorbent 15c, which is freshest.

Source 18 of ozone is preferably an ozone generator which receives air A via air inlet line 21 and generates ozone from air A to produce ozone-enriched air.

Line 17 communicates the primary treated water from tail column 14c to contact tower 19. Ozone line 20 communicates the ozone-enriched air from ozone generator 18 to contact tower 19. The ozone in the ozone-enriched air decomposes and residual miscible organic compounds, primarily the lighter organic compounds, in the primary treated water into primarily carbon dioxide ($CO_2$) and water ($H_2O$) to produce secondary treated water that is substantially free of miscible organic compounds. Ozone has a higher affinity for lighter organic compounds, such as MTBE and benzene and toluene of the BTEX family. The primary treated water preferably flows countercurrent to the ozone-enriched air in contact tower 19 such that the most contaminated water contacts the least concentrated ozone and the least contaminated water contacts the most concentrated ozone. Contact tower 19 uses a jackleg arrangement to insure efficient contacting of the primary treated water and the ozone and maintain a specific holdup volume, regardless of flow rate.

By removing the majority of the heavier organic compounds from the contaminated water prior to contacting the ozone, the effectiveness of the ozone in contact tower 19 is significantly improved. The presence of heavier organic compounds can result in displacement of the lighter organic compounds; e.g., benzene breakthrough can be accelerated by the presence of heavier organic compounds such as xylene. This displacement effect is a common response to many types of sorbents which rely on ion exchange or surface adsorption phenomena for component removal from the contaminated water. Furthermore, the lighter organic compounds are in many cases easier to oxidize. Thus, the extent of ozone post-treatment is reduced by minimizing the concentration of heavier organic compounds in the primary treated contaminated water entering contact tower 19. The combination of polymer adsorption in columns 14 followed by ozonation in contact tower 19 to remove residual and/or more volatile organic compounds produces a synergistic effect, resulting in a treatment system that is more efficient than either adsorption or ozonation by itself.

Line 22 communicates the secondary treated water from contact tower 19 to effluent surge tank 24. The secondary treated water is stored in surge tank 24, where the water can be sampled for compliance with federal, state and local environmental regulations. Upon compliance, secondary treated water W is transferred to a conventional final waste treatment or discharged from surge tank 24 in accordance with local, state and federal regulations. Discharging line 26 communicates secondary treated water W to its final destination.

Ozone regeneration is not restricted to polymers. Additional post-treatment of the secondary treated water, such as activated carbon adsorption, can be incorporated into system 1 after contact tower 19 and before surge tank 24. For example, if contaminated water C contains heavy metals, then ion exchange, metal precipitation or other systems can be added to system 1 to remove the heavy metals from the secondary treated water.

Referring once again to FIG. 1, the method of the present invention is illustrated. Contaminated water C containing miscible organic compounds such as methyl tert-butyl ether, benzene, toluene, ethylbenzene and xylene is provided in surge tank 4 via inlet line 2 from an industrial or commercial use. Contaminated water C is fed from surge tank 4 to prefilter system 10 which includes polisher 12 via pump inlet line 8, pump 6, and pump outlet line 9. Polisher 12 filters out trace amounts of suspended solids to produce polished water. The polished water is then fed from polisher 12 to system of columns 14 via line 13 at predetermined conditions based on laboratory assessment work. System of columns 14 is connected in series with lead column 14a and tail column 14c and contains adsorbent 15. The polished water enters the system of columns 14 through lead column 14a and exits through tail column 14c. Connecting line 16a feeds the effluent polished water treated in column 14a as influent to column 14b. Connecting line 16b feeds the effluent polished water treated in column 14b as influent to column 14c. Adsorbent 15a, 15b, 15c in columns 14a, 14b, 14c, respectively, irreversibly adsorbs miscible organic compounds from the polished water. Adsorbent 15 primarily adsorbs the heavier miscible organic compounds from the polished water to produce primary treated water in which the majority of the heavier miscible organic compounds have been removed. The polished water contacts adsorbent 15a, 15b, 15c in columns 14a, 14b, 14c, respectively, in a countercurrent flow such that the most contaminated water contacts adsorbent 15a, which is closest to exhaustion, and the least contaminated water contacts adsorbent 15c, which is freshest. Air A is provided to ozone generator 18 via air inlet line 20. Ozone generator 18 generates ozone from air A to produce ozone-enriched air. The ozone-enriched air is fed to contact tower 19 via line 21. The primary treated water exiting tail column 14c is fed to contact tower 19 via line 17. The ozone in the ozone-enriched air contacts the primary treated water in contact tower 19 in a countercurrent flow such that the most contaminated water contacts the least concentrated ozone and the least contaminated water contacts the most concentrated ozone. The ozone decomposes the miscible organic compounds, primarily the lighter miscible organic compounds, in the primary treated water into primarily carbon dioxide ($CO_2$) and water ($H_2O$) to produce secondary treated water that is substantially free of miscible organic compounds. The secondary treated water is then fed from contact tower 19 to surge tank 24 via line 22. The secondary treated water is then transferred to a conventional final waste treatment or disposed of via discharge line 26.

Upon adsorbent 15a in lead column 14a becoming about 75% to 80% exhausted, column 14a is disconnected from line 13 and connecting line 16a. Line 13' feeds the polished water directly to column 14b, which now becomes the lead column. Column 14d is then connected in series to tail column 14c via connecting line 16c to become the new tail column. Line 17 is disconnected from column 14c. The primary treated water exiting system of columns 14 exits through column 14d and line 17'. In this way, system 1 can operate on an essentially continuous basis. The secondary treated water, containing ozone and water, is circulated from surge tank 24 through adsorbent 15a in column 14a. (In addition, hydrogen peroxide ($H_2O_2$) can be added to the ozone/water mixture to enhance or speed up the regeneration process.) The ozone and water removes the organic compounds in adsorbent 15a, thereby rejuvenating adsorbent 15a. The spent ozone and water is then discharged from column 14a. Column 14a, containing rejuvenated adsorbent 15a, can then be connected in series to column 14d as the next tail column when adsorbent 15b in column 14b becomes about 75% to 80% exhausted. In this way, adsorbent 15 can be reused, minimizing the cost of adsorbent 15 in using system 1. Adsorbent 15 is not completely regenerated in this process and ultimately becomes spent. Spent adsorbent 15 is periodically removed from columns 14 and replaced with fresh adsorbent 15.

EXAMPLE 1

System 1 was used without prefilter system 10 and the ozone treatment in contact tower 19. System 1 used a styrene-butadiene-styrene compound (SBS) (similar to Shell's Kraton D) as adsorbent 15 in system of columns 14. The bed depth of columns 14 was approximately thirty-three inches (33'), which is similar to the depth used in a "typical" 55 gallon drum column system.

System 1 was fed fuel contaminated groundwater from a petroleum product storage site at a rate of ten (10) bed volumes per hour. (A bed volume ("BV") is the volume equal to the amount of adsorbent contained in one of the columns.) This rate translates to a drum column system rate of 450–500 gallons/hour. Periodically, samples of effluent from each column were taken and specific cuts analyzed for BTEX compounds.

A sample of the BV 440 effluent was sparged with air in a standard bubbler arrangement to observe the effect of air post-treatment on the treated wastewater.

Table 1 presents the breakthrough results of MTBE and BTEX compounds, expressed in parts per billion by weight ("ppb"), and removal efficiency of each column at the specified BV. Benzene, toluene, ethylbenzene and xylene together comprise the Total VOAs listed in the Table. As shown in Table 1, adsorbent 15 removes primarily the heavier organic compounds such as ethylbenzene and xylene. In particular, lead column 14a removed at least 89% of the ethylbenzene and xylene compounds even after the benzene and toluene compounds had substantially broken through. Also, the individual BTEX breakthrough fractions in the sparged sample were all less than 5 ppb, demonstrating the enhanced efficiency of combining polymer adsorption with an air or ozone post-treatment. The air sparged sample contained only about 3% of the starting MTBE and 1% or less of the starting concentration of each BTEX compound.

TABLE 1

| Column 1 Breakthrough Results (expressed as ppb) | | | | |
|---|---|---|---|---|
| BV | 40 | 80 | 160 | 240 |
| MTBE | 8623 | 18288 | 20552 | 22168 |
| Benzene | 375 | 2106 | 3777 | 3349 |
| Toluene | 52 | 140 | 1494 | 3876 |
| Ethylb. | 10 | 25 | 50 | 50 |
| Xylene | 10 | 25 | 50 | 50 |
| TOTAL VOA | 447 | 2296 | 5371 | 7325 |

| Column 1 Breakthrough Results (continued) | | | |
|---|---|---|---|
| BV | 320 | 440 | FEED SOLUTION |
| MTBE | 18360 | 18845 | 25395 |
| Ben. | 3225 | 3329 | 8406 |
| Tol. | 3424 | 3680 | 15701 |
| Eth. | 50 | 50 | 489 |
| Xyl. | 50 | 107 | 3880 |
| TOTAL VOA | 6749 | 7166 | 28476 |

| Column 1 % Component Removal | | | | |
|---|---|---|---|---|
| BV | 40 | 80 | 160 | 240 |
| MTBE | 66.0 | 28.0 | 19.1 | 12.7 |
| Ben. | 95.9 | 74.9 | 55.1 | 60.2 |
| Tol. | 99.7 | 99.1 | 90.5 | 75.3 |
| Eth. | 98.0 | 94.9 | 89.8 | 89.8 |
| Xyl. | 99.7 | 99.4 | 98.7 | 98.7 |
| TOTAL VOA | 98.4 | 91.9 | 81.1 | 74.3 |

| Column 1 % Component Removal (continued) | | |
|---|---|---|
| BV | 320 | 440 |
| MTBE | 27.7 | 25.8 |
| Ben. | 61.6 | 60.4 |
| Tol. | 78.2 | 76.6 |
| Eth. | 89.8 | 89.8 |
| Xyl. | 98.7 | 97.2 |
| TOTAL VOA | 76.3 | 74.8 |

| Column 2 Breakthrough Results (expressed as ppb) | | | | |
|---|---|---|---|---|
| BV | 80 | 240 | 320 | 440 |
| MTBE | 21198 | 18897 | 19193 | 20902 |
| Ben. | 228 | 2315 | 2736 | 2611 |
| Tol. | 50 | 255 | 770 | 2553 |
| Eth. | 50 | 50 | 50 | 50 |
| Xyl. | 50 | 50 | 50 | 50 |
| TOTAL VOA | 378 | 2670 | 3606 | 5264 |

| Column 2 % Component Removal | | | | |
|---|---|---|---|---|
| BV | 80 | 240 | 320 | 440 |
| MTBE | 16.5 | 25.6 | 24.4 | 17.7 |
| Ben. | 97.3 | 72.5 | 67.5 | 68.9 |
| Tol. | 99.7 | 98.4 | 95.1 | 83.7 |
| Eth. | 89.8 | 89.8 | 89.8 | 89.8 |
| Xyl. | 98.7 | 98.7 | 98.7 | 98.7 |
| TOTAL VOA | 98.7 | 90.6 | 87.3 | 81.5 |

TABLE 1-continued

Column 3 Breakthrough Results (expressed as ppb)

| BV | 80 | 240 | 320 | 440 | Air Sparged 440 |
|---|---|---|---|---|---|
| MTBE | 16999 | — | 18790 | 20077 | 774 |
| Ben. | 25 | 3675 | 1884 | 2063 | <5 |
| Tol. | 25 | 50 | 50 | 246 | <5 |
| Eth. | 25 | 50 | 50 | 50 | <5 |
| Xyl. | 25 | 50 | 50 | 50 | <5 |
| TOTAL VOA | 100 | 3825 | 2034 | 2409 | <20 |

Column 3 % Component Removal

| BV | 80 | 240 | 320 | 440 | Air Sparged 440 |
|---|---|---|---|---|---|
| MTBE | 33.1 | 100.0 | 26.0 | 20.9 | 97.0 |
| Ben. | 99.7 | 56.3 | 77.6 | 75.5 | 99.9 |
| Tol. | 99.8 | 99.7 | 99.7 | 98.4 | 100.0 |
| Eth. | 94.9 | 89.8 | 89.8 | 89.8 | 99.0 |
| Xyl. | 99.4 | 98.7 | 98.7 | 98.7 | 99.9 |
| TOTAL VOA | 99.6 | 86.6 | 92.9 | 91.5 | 99.9 |

EXAMPLE 2

System 1 was set up as in EXAMPLE 1 above, but including ozone post-treatment with contact tower 19.

System 1 was fed sludge water from the bottom of a commercial fuel (gasoline) storage tank at a rate of ten (10) bed volumes per hour. The total VOAs in the feed water was considerably higher than in the contaminated groundwater of EXAMPLE 1. Periodically, samples of effluent from each column were taken and specific cuts analyzed for BTEX compounds.

Table 2 presents the breakthrough results of MTBE and BTEX compounds, expressed in parts per billion by weight ("ppb"), and removal efficiency of each column at the specified BV. As noted in Table 1, adsorbent 15 removes primarily the heavier organic compounds such as ethylbenzene and xylene. In particular, lead column 14a removed at least 97% of the ethylbenzene and xylene compounds even after the benzene and toluene compounds had substantially broken through. At a BV of 80, the xylene and overall VOA removal efficiency for system of columns 14 was in excess of 99%. Also, the individual BTEX breakthrough fractions in the 10 minute ozonation treatment sample of Table 2 were all less than 5 ppb, demonstrating the enhanced efficiency of combining polymer adsorption with ozone post-treatment.

TABLE 2

Column 1 Breakthrough Results (expressed as ppb)

| BV | 40 | 80 | Contaminated Feed Water |
|---|---|---|---|
| MTBE | 42202 | 63284 | 119306 |
| Ben. | 724 | 2276 | 8370 |
| Tol. | 50 | 1093 | 23430 |
| Eth. | 50 | 50 | 2380 |
| Xyl. | 50 | 50 | 17358 |
| TOTAL VOA | 874 | 3469 | 51538 |

Column 1 % Component Removal

| BV | 40 | 80 |
|---|---|---|
| MTBE | 64.6 | 47.0 |
| Ben. | 91.4 | 72.8 |

TABLE 2-continued

| | | |
|---|---|---|
| Tol. | 99.8 | 95.3 |
| Eth. | 97.9 | 97.9 |
| Xyl. | 99.7 | 99.7 |
| TOTAL VOA | 98.3 | 93.3 |

Column 3 Breakthrough Results (expressed as ppb)

| BV | 40 | 80 |
|---|---|---|
| MTBE | 12225 | 78438 |
| Ben. | 50 | 100 |
| Tol. | 50 | 100 |
| Eth. | 50 | 100 |
| Xyl. | 50 | 100 |
| TOTAL VOA | 200 | 400 |

Column 3 % Component Removal

| BV | 40 | 80 |
|---|---|---|
| MTBE | 89.8 | 34.3 |
| Ben. | 99.4 | 98.8 |
| Tol. | 99.8 | 99.6 |
| Eth. | 97.9 | 95.8 |
| Xyl. | 99.7 | 99.4 |
| TOTAL VOA | 99.6 | 99.2 |

Ozone Treatment of Column 3 Composite: 100 BV

| | | Time of Ozonation | |
|---|---|---|---|
| Ozonation | Composite | 5 minutes | 10 minutes |
| MTBE | 47566 | 158 | — |
| Ben. | 65 | 10 | 0.2 |
| Tol. | 145 | 10 | 0.2 |
| Eth. | 20 | 10 | 0.2 |
| Xyl. | 20 | 10 | 0.2 |
| TOTAL VOA | 250 | 40 | 0.8 |

Ozone Treatment of Column 3 Composite: 100 BV
% Component Removal

| | | Time of Ozonation | |
|---|---|---|---|
| Ozonation | Composite | 5 minutes | 10 minutes |
| MTBE | 60.1 | 99.87 | — |
| Ben. | 99.2 | 99.88 | 99.998 |
| Tol. | 99.4 | 99.96 | 99.999 |
| Eth. | 99.2 | 99.58 | 99.992 |
| Xyl. | 99.9 | 99.92 | 99.999 |
| TOTAL VOA | 99.5 | 99.92 | 99.998 |

After exhaustion, exhausted adsorbent 15a was washed with a small amount of water (1 BV), then removed from lead column 14a and submitted for TCLP (potential toxicity) analysis.

Table 2a presents the results of the TCLP analysis. The concentrations of the contaminants are in units of milligrams per liter (mg/L). As shown in Table 2a, the concentrations of organic contaminants remaining in the adsorbent 15a after washing were below the regulatory limit. Thus, the exhausted adsorbent 15 is non-hazardous as defined by the TLLP test procedure. It could be used as an efficient immiscible organic pick-up agent; or as an elastomer additive into such materials as asphalt or coal-tar mixes for road surfacing.

TABLE 2a

TCLP (EPA Method 1311)

| Component | Exhausted Adsorbent Residue Concentration (mg/L) | Regulatory Limit (mg/L) |
| --- | --- | --- |
| Benzene | <0.005 | 0.5 |
| Carbon Tetrachloride | <0.001 | 0.5 |
| Chlorobenzene | <0.001 | 100.0 |
| Chloroform | <0.001 | 6.0 |
| 1,2-Dichloroethane | <0.001 | 0.5 |
| Trichloroethane | <0.001 | 0.5 |
| Tetrachloroethane | <0.001 | 0.7 |
| 1,4-Dichlorobenzene | <0.001 | 7.5 |
| 1,1-Dichloroethene | <0.001 | 0.7 |
| Vinyl Chloride | <0.001 | 0.2 |

EXAMPLE 3

System 1 was set up as in EXAMPLE 2 above. Columns 14 were sixteen inches (16") in diameter with approximately 31 gallons of adsorbent per column.

System 1 was fed contaminated water from a groundwater site located near a gasoline filling station. The contaminated water was fed to system 1 at a rate of 1.5 to 2 gallons per minute. Periodically, samples of effluent from each column were taken and specific cuts analyzed for BTEX compounds. Lead column 14a was disconnected when adsorbent 15a had reached a loading of about 75% to 80% of its ultimate capacity. Fresh column 14d was then connected in series to tail column 14c, with column 14b becoming the lead column.

An air stripper was already in place at the site and used to treat effluent from columns 14 as well as raw contaminated water.

Table 3 presents the breakthrough results of MTBE and BTEX compounds, expressed in parts per billion ("ppb"), and removal efficiency of each column at the specified effective BV. As noted in Tables 1 and 2, adsorbent 15 removes primarily the heavier organic compounds such as ethylbenzene and xylene. Lead column 14a consistently removed more ethylbenzene and xylene than MTBE, benzene or toluene. Polymer adsorption in columns 14 followed by ozonation in contact tower 19 removed about 98% of the MTBE and about 99% of the VOAs from the treated wastewater.

A sample of raw ground water was also treated with ozone to illustrate the impact of column treatment on casting downstream polishing operations. The results of this test are shown at the end of Table 3.

TABLE 3

Column 1 Breakthrough Results (expressed as ppb)

| Effluent BV | Feed | 81 | Feed | 154 |
| --- | --- | --- | --- | --- |
| MTBE | 50 | 28 | 50 | 20 |
| Ben. | 2700 | 1463 | 2676 | 2290 |
| Tol. | 7516 | 205 | 8120 | 2317 |
| Eth. | 708 | 5 | 756 | 10 |
| Xyl. | 4176 | 5 | 4452 | 10 |
| TOTAL VOA | 15100 | 1678 | 16004 | 4627 |

Column 1 Breakthrough Results (continued)

| Effluent BV | Feed | 574 | Feed | 640 |
| --- | --- | --- | --- | --- |
| MTBE | 25 | 25 | 20 | 10 |
| Ben. | 2448 | 1987 | 1902 | 1882 |
| Tol. | 7380 | 5461 | 5432 | 5334 |
| Eth. | 708 | 376 | 490 | 430 |
| Xyl. | 4098 | 2086 | 2880 | 2370 |
| TOTAL VOA | 14634 | 9910 | 10704 | 10016 |

Column 1 % Component Removal

| BV | 81 | 154 | 574 | 640 |
| --- | --- | --- | --- | --- |
| MTBE | 44.0 | 60.0 | 0.0 | 50.0 |
| Ben. | 45.8 | 14.4 | 18.8 | 1.1 |
| Tol. | 97.3 | 71.5 | 26.0 | 1.8 |
| Eth. | 99.3 | 98.7 | 46.9 | 12.2 |
| Xyl. | 99.9 | 99.8 | 49.1 | 17.7 |
| TOTAL VOA | 88.9 | 71.1 | 32.3 | 6.4 |

Column 3 Breakthrough Results (expressed as ppb)

| Effluent BV | Feed | 81 | Feed | 154 |
| --- | --- | --- | --- | --- |
| MTBE | 50 | 6 | 50 | 37 |
| Ben. | 2700 | 70 | 2676 | 522 |
| Tol. | 7516 | 6 | 8120 | 51 |
| Eth. | 708 | 1 | 756 | 5 |
| Xyl. | 4176 | 1 | 4452 | 5 |
| TOTAL VOA | 15100 | 78 | 16004 | 583 |

Column 3 Breakthrough Results (continued)

| Effluent BV | Feed | 574 | Feed | 640 |
| --- | --- | --- | --- | --- |
| MTBE | 25 | 10 | 20 | 10 |
| Ben. | 2448 | 2014 | 1902 | 2037 |
| Tol. | 7380 | 4376 | 5432 | 4952 |
| Eth. | 708 | 10 | 490 | 10 |
| Xyl. | 4098 | 32 | 2880 | 53 |
| TOTAL VOA | 14634 | 6432 | 10704 | 7052 |

Column 3 % Component Removal

| BV | 81 | 154 | 574 | 640 |
| --- | --- | --- | --- | --- |
| MTBE | 88.0 | 26.0 | 60.0 | 50.0 |
| Ben. | 97.4 | 80.5 | 17.7 | — |
| Tol. | 99.9 | 99.4 | 40.7 | 8.8 |
| Eth. | 99.9 | 99.3 | 98.6 | 98.0 |
| Xyl. | 100.0 | 99.9 | 99.2 | 98.2 |
| TOTAL VOA | 99.5 | 96.4 | 56.0 | 34.1 |

Ozone Treatment Tests

| | Ground Water Feed | Column 3 Effluent |
| --- | --- | --- |
| MTBE | 50 | 50 |
| Ben. | 1772 | 1788 |
| Tol. | 5968 | 5140 |
| Eth. | 586 | 22 |
| Xyl. | 3492 | 208 |
| TOTAL VOA | 11818 | 7158 |

Column System % Component Removal

| | |
| --- | --- |
| MTBE | 0.0 |
| Ben. | — |
| Tol. | 13.9 |
| Eth. | 96.2 |
| Xyl. | 94.0 |
| TOTAL VOA | 39.4 |

TABLE 3-continued

Ozone Treatment of Column 3 Effluent Breakthrough Results

|  | Time of Ozonation | |
|---|---|---|
|  | 5 minutes | 10 minutes |
| MTBE | <1 | <1 |
| Ben. | <1 | <1 |
| Tol. | <1 | <1 |
| Eth. | <1 | <1 |
| Xyl. | <1 | <1 |
| TOTAL VOA | <1 | <1 |

Ozone Treatment of Column 3 Effluent % Component Removal

|  | Time of Ozonation | |
|---|---|---|
|  | 5 minutes | 10 minutes |
| MTBE | 98.00 | 98.00 |
| Ben. | 99.94 | 99.94 |
| Tol. | 99.98 | 99.98 |
| Eth. | 99.83 | 99.83 |
| Xyl. | 99.97 | 99.97 |
| TOTAL VOA | 99.99[?] | 99.99[?] |

Ozone Treatment of Ground Water Feed (Without Column Treatment)

|  | Time of Ozonation | |
|---|---|---|
|  | 5 minutes | 10 minutes |
| MTBE | 5 | 4 |
| Ben. | 264 | 15 |
| Tol. | 325 | 14 |
| Eth. | 3 | 1 |
| Xyl. | 54 | 1 |
| TOTAL VOA | 646 | 31 |

Ozone Treatment of Ground Water Feed % Component Removal

|  | Time of Ozonation | |
|---|---|---|
|  | 5 minutes | 10 minutes |
| MTBE | 90.00 | 92.00 |
| Ben. | 85.10 | 99.15 |
| Tol. | 94.55 | 99.77 |
| Eth. | 99.49 | 99.83 |
| Xyl. | 98.45 | 99.97 |
| TOTAL VOA | 94.53 | 99.74 |

EXAMPLE 4

System 1 was used as in EXAMPLE 1. System 1 was fed a sample of well water contaminated with perchloroethylene (PERC) and 800 BV of effluent was recovered. Table 4 shows the concentration of perchloroethylene in the well water before and after treatment.

TABLE 4

Perchloroethylene Removal from Well Water Breakthrough Test Results

| Water | Perchloroethylene Concentration (ppb) |
|---|---|
| Well Water Feed | 6.0 |
| Effluent BV 640 | <1.0 |
| Effluent BV 800 | <1.0 |
| Composite of 800 BV | <0.5 |

EXAMPLE 5

A single column, ½" diameter by 30" high was filled with polymer similar to that used in Example 1. Gasoline contaminated water was then fed to the column at a specific flow rate of about 2.5 gpm/ft$^2$ of cross-sectional area. The effluent from the single column was sampled after five (5) liters and ten (10) liters of water had been treated. The total effluent (ten (10) liters) was composited and a sample taken.

The composite sample was then ozonated for about thirty (30) minutes. The ozonated solution was then sampled.

After treating ten (10) liters of contaminated water, the spent polymer was removed from the column and put into a small mix tank with fresh water. Ozone was then bubbled through the polymer so as to achieve a well-mixed slurry. Ozonation continued for a period of about one (1) hour.

The ozone-treated polymer was then reloaded into the single column and an additional 10 liters of water passed through the column. The initial contaminated water treatment procedure (previously outlined) was repeated. The spent polymer was again treated with ozone ("rejuvenation" or regeneration procedure); and, the ozonated polymer returned to the column.

The water treatment/polymer regeneration procedure was carried out three (3) more times; resulting in a total of five (5) treatments uses for the polymer. Thus, with the regeneration technique, the initial polymer was used four (4) additional times.

The results for the initial, third, and fifth polymer use are shown in Table 5-1.

TABLE 5

Single Column Treatment Of Gasoline Contaminated Water With Regenerated Polymer.

| Component | Feed | 5 Liter (50 BV) | 10 Liter (100 BV) | EFFL'T COMP. | OZONT'D COMP. |
|---|---|---|---|---|---|
| Run 1: Column Loaded With Fresh Polymer (100 ml BV) Analysis (ppb) | | | | | |
| MTBE | 4,176 | 5,082 | 3,804 | 4,540 | 20 |
| Benzene | 5,500 | 2,430 | 2,005 | 1,198 | 1 |
| Toluene | 10,975 | 62 | 615 | 108 | 1 |
| Ethyl-benzene | 750 | 10 | 10 | 10 | 1 |
| Xylene | 5,340 | 10 | 10 | 10 | 1 |
| Total VOA* | 22,565 | 2,512 | 2,640 | 1,326 | 4 |
| BTEX Removal Efficiency Compared To Feed (%/Weight): | | | | | |
|  |  | 55.8 | 63.5 | 78.2 | 99.98 |
|  |  | 99.4 | 94.4 | 99.0 | 99.99 |
|  |  | 98.7 | 98.7 | 98.7 | 99.87 |
|  |  | 99.8 | 99.8 | 99.8 | 99.98 |
|  |  | 88.9 | 88.3 | 94.1 | 99.98 |
| Run 3: Column Loaded With Twice Regenerated Polymer (100 ml BV) Analysis (ppb) | | | | | |
| MTBE | 6,510 | 5,690 | 5,362 | 5,236 | 25 |
| Benzene | 1,596 | 750 | 1,312 | 492 | 1 |
| Toluene | 3,228 | 136 | 427 | 125 | 1 |
| Ethyl-benzene | 640 | 16 | 20 | 10 | 1 |
| Xylene | 3,562 | 134 | 142 | 120 | 1 |
| Total VOA | 9,026 | 1,036 | 1,901 | 747 | 4 |
| BTEX Removal Efficiency Compared To Feed (%/Weight): | | | | | |
|  |  | 53.0 | 17.8 | 69.2 | 99.94 |
|  |  | 95.8 | 86.8 | 96.1 | 99.97 |
|  |  | 97.5 | 96.9 | 98.4 | 99.84 |
|  |  | 96.2 | 96.0 | 96.6 | 99.97 |
|  |  | 88.5 | 78.9 | 91.7 | 99.96 |
| Run 5: Column Loaded With Polymer Regenerated 4 Times (100 ml BV) Analysis (ppb) | | | | | |
| MTBE | 9,150 | 7,500 | 7,680 | 6,840 | 1 |
| Benzene | 2,560 | 660 | 2,080 | 825 | 1 |

TABLE 5-continued

Single Column Treatment Of Gasoline Contaminated Water With Regenerated Polymer.

| Component | Feed | 5 Liter (50 BV) | 10 Liter (100 BV) | EFFL'T COMP. | OZONT'D COMP. |
|---|---|---|---|---|---|
| Toluene | 7,000 | 60 | 740 | 155 | 1 |
| Ethylbenzene | 1,325 | 50 | 50 | 25 | 1 |
| Xylene | 8,200 | 50 | 50 | 25 | 1 |
| Total VOA | 19,085 | 820 | 2,920 | 1,030 | 4 |
| BTEX Removal Efficiency Compared To Feed (%/Weight): | | | | | |
| | | 74.2 | 18.8 | 67.8 | 99.96 |
| | | 99.1 | 89.4 | 97.8 | 99.99 |
| | | 96.2 | 96.2 | 98.1 | 99.92 |
| | | 99.4 | 99.4 | 99.7 | 99.98 |
| | | 95.7 | 84.7 | 94.6 | 99.98 |

*Total VOA = Benzene + Toluene + Ethylbenzene + Xylene (BTEX)

As can be seen, there are no substantial differences, from an organic recovery standpoint, as the polymer is used after regeneration. The results, therefore, indicate that ozone regeneration allowed the polymer to be used multiple times. This obviously has significant economic advantages compared to systems wherein the polymer could be used only once.

The fact that ozone results in the regeneration of the polymer is a totally unexpected result, since typically elastomers are detrimentally affected by strong oxidizing agents, such as ozone. Thus, the fact that ozone destroys the adsorbed organics without adverse affect on the polymer is not obvious, especially in view of the previously mentioned concerns regarding the negative effects of ozone on polymers.

While not intended as a definitive technical explanation, it is submitted that the ozone attacks the surface of the polymer, wherein the organic contaminants have been adsorbed. The ozone breaks down the contaminants into $CO_2$, $H_2O$ and the like. A thin layer of the polymer is probably oxidized to some extent, but the actual weight of polymer-material destroyed is quite small. Initial estimates are that less than five (5%) percent of the polymer is oxidized during the ozone regeneration. Thus, while five (5) cycles of polymer use are indicated in this example, the ultimate number of uses which could be obtained from a given amount of initial polymer is not known, but is probably dependent on the nature of the organics adsorbed and the extent of ozonation time required to achieve regeneration.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for removing miscible organic compounds from contaminated water, comprising the steps of:
   (a) providing contaminated water which contains miscible organic compounds;
   (b) feeding the contaminated water from said providing step (a) to a prefilter system which includes a polisher;
   (c) filtering out suspended solids from the contaminated water in the polisher to produce polished water;
   (d) feeding the polished water from said filtering step (c) to a system of columns which contain an adsorbent and are connected in series with a lead column and a tail column such that the polished water enters the system of columns through the lead column and exits through the tail column, said adsorbent being a block co-polymer that primarily adsorbs heavier miscible organic compounds from the polished water;
   (e) adsorbing the miscible organic compounds from the polished water with the adsorbent in the columns to produce primary treated water in which the majority of the heavier organic compounds have been removed;
   (f) providing a source of ozone;
   (g) feeding the ozone from said providing step (f) to a contact tower;
   (h) feeding the primary treated water from said adsorbing step (e) to a contact tower;
   (i) decomposing the miscible organic compounds in the primary treated water with the ozone in the contact tower to produce secondary treated water that is substantially free of miscible organic compounds and suspended solids;
   (j) discharging the secondary treated water from the contact tower;
   (k) disconnecting the lead column of said feeding step (d) when the adsorbent in the lead column is about 75% to 80% exhausted;
   (l) transferring the flow of polished water from the lead column in said disconnecting step (k) to the next column in the system of columns such that the next column becomes the lead column;
   (m) connecting in series a column which contains fresh adsorbent to the tail column in said feeding step (d) such that the connected column becomes the tail column;
   (n) providing a source of ozone and water;
   (o) circulating said ozone and water in the lead column of said disconnecting step (k);
   (p) removing the adsorbed organic compounds in said adsorbent with said ozone and water to rejuvenate said adsorbent in said column; and,
   (q) discharging said ozone and water with the decomposed miscible organic compounds from said column of said removing step (p) to produce a freshly rejuvenated adsorbent column.

2. The method of claim 1, wherein said providing step (f) comprises the steps of:
   (1) providing a source of air;
   (2) feeding the air from said providing step (1) to an ozone generator; and,
   (3) generating ozone from the air in the ozone generator to product ozone-enriched air.

3. The method of claim 1, wherein the ozone in said decomposing step (i) primarily decomposes the lighter miscible organic compounds in the primary treated water.

4. The method of claim 1, wherein in said adsorbing step (e), the polished water contacts the adsorbent in a countercurrent flow such that the most contaminated water contacts the adsorbent that is closest to exhaustion and the least contaminated water contacts the adsorbent that is freshest.

5. The method of claim 1, wherein in said decomposing step (i), the primary treated water contacts the ozone in the contact tower in a countercurrent flow such that the most contaminated water contacts the least concentrated ozone and the least contaminated water contacts the most concentrated ozone.

6. The method of claim 1, wherein said source of ozone and water is the secondary treated water of said discharging step (j).

7. The method of claim 1, wherein the rejuvenated adsorbent in the column of said discharging step (q) ultimately becomes spent, further comprising the steps of:
- (r) periodically removing the spent adsorbent from the column of said disconnecting step (k); and,
- (s) replacing the spent adsorbent of said removing step (r) with fresh adsorbent.

8. A method of rejuvenating adsorbent in individual columns that is about 75% to 80% exhausted, the columns being connected in series with a lead column and a tail column and fed contaminated water which contains miscible organic compounds such that the adsorbent irreversibly adsorbs the miscible organic compounds from the contaminated water, thereby exhausting the adsorbent, said adsorbent being a block co-polymer, said method comprising the steps of:
- (a) disconnecting the lead column from the columns connected in series;
- (b) transferring the flow of contaminated water from the lead column of said disconnecting step (a) directly to the next column in series such that the next column becomes the lead column;
- (c) providing a column with fresh adsorbent;
- (d) connecting the column from said providing step (c) in series to the tail column such that the connected column becomes the tail column;
- (e) providing a source of ozone and water;
- (f) circulating the ozone and water in the lead column of said disconnecting step (a);
- (g) removing the miscible organic compounds in the adsorbent with the ozone and water to rejuvenate the adsorbent in the column; and,
- (h) discharging the ozone and water with the miscible organic compounds from the column of said removing step (g) to produce a freshly rejuvenated adsorbent column.

9. The method of claim 8, wherein the rejuvenated adsorbent in the column of said discharging step (h) ultimately becomes spent, further comprising the steps of:
- (i) periodically removing the spent adsorbent from the column of said disconnecting step (a); and
- (j) replacing the spent adsorbent of said removing step (i) with fresh adsorbent.

10. A system for removing miscible organic compounds from contaminated water, comprising:
- (a) a source of contaminated water containing miscible organic compounds;
- (b) a prefilter system which includes a polisher for removing suspended solids from said contaminated water to produce polished water;
- (c) means for communicating said contaminated water from said source of contaminated water to said prefilter system;
- (d) a system of columns connected in series with a lead column and a tail column such that polished water enters said system through said lead column and exits through said tail column and containing an adsorbent for adsorbing miscible organic compounds from the polished water to produce primary treated water in which the majority of the heavier organic compounds have been removed, said adsorbent being a block co-polymer that primarily adsorbs heavier miscible organic compounds from the polished water;
- (e) means for communicating the effluent of one said column as influent to the next said column connected in series;
- (f) means for communicating the polished water from said prefilter system to said lead column;
- (g) a source of ozone;
- (h) a contact tower for contacting the primary treated water with the ozone such that the ozone decomposes the miscible organic compounds in the primary treated water, producing secondary treated water that is substantially free of miscible organic compounds;
- (i) means for communicating ozone from said source of ozone to said contact tower;
- (j) means for communicating said primary treated water from said tail column to said contact tower; and,
- (k) means for discharging said secondary treated water from said contact tower; and,
- (l) means for regenerating said adsorbent in said columns by contact with ozone provided from said source thereof.

11. The system of claim 10, wherein said source of ozone comprises:
- (1) a source of air;
- (2) an ozone generator which generates ozone from the air to produce ozone-enriched air; and
- (3) means for communicating the air from said source of air to said ozone generator.

12. The system of claim 10, wherein said block co-polymer is styrene-isoprene-styrene.

13. The system of claim 10, wherein said block co-polymer is styrene-butadiene-styrene.

14. The system of claim 10, wherein said block co-polymer is styrene-ethylene/butylene-styrene.

15. The system of claim 10, wherein the ozone in said contact tower decomposes primarily the lighter miscible organic compounds from the primary treated water.

16. The system of claim 10, further comprising:
- (m) a surge tank for storing the secondary treated water, said surge tank being connected to said discharging means; and,
- (n) means for communicating the secondary treated water from said contact tower to said surge tank.

17. The system of claim 10, wherein said means for regenerating circulates said ozone and said water in said lead column to remove said adsorbed organic compounds in said adsorbent.

* * * * *